United States Patent

Boyd et al.

[11] Patent Number: 5,150,662
[45] Date of Patent: Sep. 29, 1992

[54] SNOWMOBILE FLOTATION SYSTEM

[76] Inventors: James A. Boyd, RR #2, Port Carling, Ontario, Canada, P1B 3C6; Dan Melanson, 1267 Bancroft Drive, Sudbury, Ontario, Canada, P3B 1R6

[21] Appl. No.: 684,235

[22] Filed: Apr. 12, 1991

[51] Int. Cl.⁵ .............................................. B63B 5/24
[52] U.S. Cl. ..................................... 114/68; 114/270; 180/190
[58] Field of Search ............... 114/68, 343, 270, 283, 114/360, 123, 364; 80/190; 441/82

[56] References Cited

U.S. PATENT DOCUMENTS

| 3,092,853 | 6/1963 | Owen | 114/68 X |
| 3,340,842 | 9/1967 | Winslow | 114/68 |
| 3,465,987 | 9/1969 | Harmon | 441/30 X |
| 3,707,938 | 1/1973 | Olson | 114/270 |
| 4,864,961 | 9/1989 | Slonski | 114/68 X |
| 4,893,692 | 1/1990 | Smith | 180/190 |

Primary Examiner—Edwin L. Swinehart
Attorney, Agent, or Firm—H. Jay Spiegel

[57] ABSTRACT

Disclosed is a flotation system designed to be incorporated into an existing snowmobile and including a plurality of floats which may be inflated either selectively or automatically. The device is intended to be incorporated into a snowmobile which is used on ice covered bodies of water. Sometimes, during such use, the ice breaks causing the snowmobile to sink and thereby be destroyed. Through the use of the present invention, flotation is provided to maintain the snowmobile in a floating position to allow safe retrieval.

8 Claims, 3 Drawing Sheets

SNOWMOBILE FLOTATION SYSTEM

BACKGROUND OF THE INVENTION

The present invention relates to a snowmobile flotation system. In the prior art, it is known to provide auxiliary flotation for a vessel such as, for example, a boat. U.S. Patent Number 4,864,961 to Slonski discloses an auxiliary flotation system for a boat including a plurality of floats which may be inflated either automatically or manually from a source of pressurized gas to maintain flotation of the vessel. This different from the teachings of the present invention which contemplates incorporation of a flotation system on a device, namely a snowmobile, which is not normally expected to float during its normal mode of operation. It is believed that the present invention patentably distinguishes from the teachings of Slonski as incorporating a flotation system into a snowmobile and as including a manner of actuation which is materially different from the teachings of Slonski.

SUMMARY OF THE INVENTION

The present invention relates to a snowmobile flotation system. The present invention includes the following interrelated objects, aspects and features:

(1) In a first aspect, it is important to note that the present invention is intended to be an accessory which may be added to an existing snowmobile. As is known by those skilled in the art, a snowmobile consists of two steerable skis and a rear drive belt powered by a motor such as, for example, a gasoline powered motor. Snowmobiles are heavy vehicles which quickly sink if they are immersed in water.

(2) The present invention contemplates installing on an existing snowmobile or installing on a snowmobile at the time of manufacture thereof a plurality of flotation devices at various strategic points about the periphery thereof. The flotation devices are interconnected through a fluid handling system to a source of inflation gas such as, for example, a cannister of carbon dioxide.

(3) When the flotation devices are in their stowed, inoperative configuration, they are covered by an outer cover made of a material such as, for example, VINYL including fastening means such as, for example, hook and pile fasteners known, for example, by the Registered Trademark VELCRO ®.

(4) Two embodiments of the actuator for the inventive system are disclosed. In a first embodiment, the gas cannister is opened by a puncturing rod activated through manual pulling of an actuator handle. In a second embodiment, a reciprocating puncture rod is activated by a solenoid, responsive to closing of a moisture-sensitive switch which is closed when the switch is immersed in water.

(5) When a snowmobile with the subject invention incorporated therewith is operated on ice covering a body of water, and the ice breaks causing the snowmobile to drop into the body of water, the inventive system is activated either through pulling of the actuator handle or through automatic activation of the solenoid responsive to immersion of the moisture-sensitive switch, to cause puncturing of the cannister of inflation gas, whereupon the floats are inflated to maintain the snowmobile in a floating condition until it may be retrieved.

As such, it is a first object of the present invention to provide an improved snowmobile flotation system.

It is a further object of the present invention to provide such a system including a plurality of flotation devices attached at spaced locations about the periphery of a snowmobile.

It is a still further object of the present invention to provide such a system having the option of either manual or automatic activation.

It is a still further object of the present invention to provide such a system wherein activation is accomplished by releasing gas from a closed pressurized container thereof by puncturing the container with a puncture rod.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
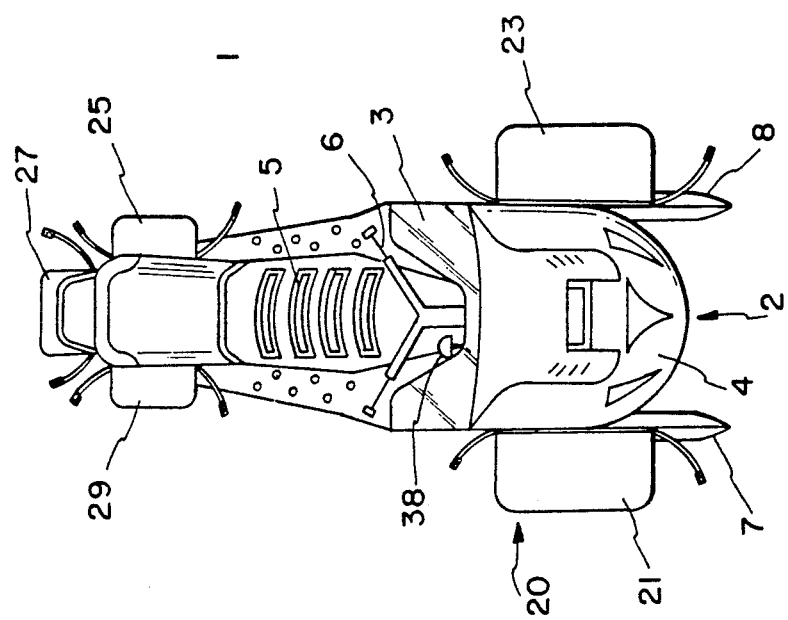
FIG. 1 shows a view from above and forward of a snowmobile having the inventive flotation system incorporated therewith, with the flotation devices thereof in an inflated condition.
Figure 8:
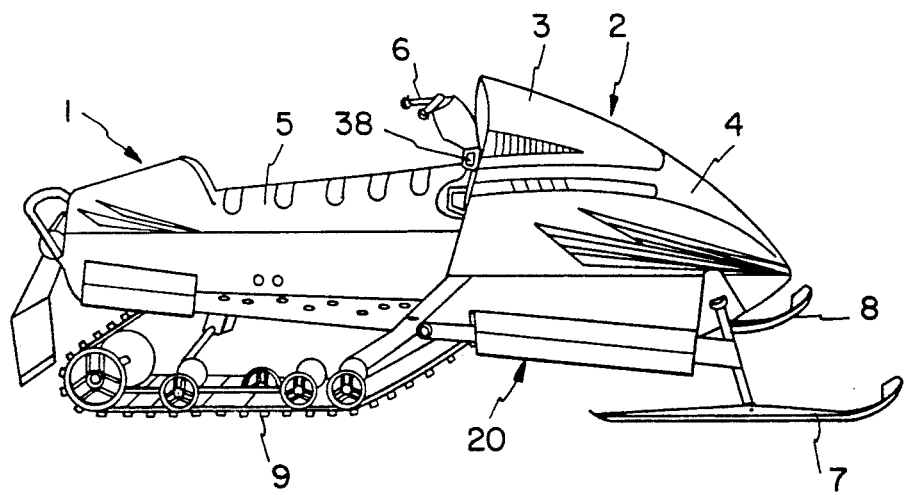
FIG. 8 shows a side view of the inventive system with the flotation devices thereof in an uninflated condition.

With reference to FIGS. 1 and 8, a snowmobile is generally designated by the reference numeral 1 and is seen to include a body 2 having a windshield 3, a forward cowling 4, a seat 5, controlling and steering handlebars 6, skis 7, 8 and a tread 9. The tread 9 is rotated by virtue of a mode of power source (not shown) which is usually a gasoline powered motor. As is understood by those skilled in the art, the motive of power source causes rotational movements of the belt 9 to propel the snowmobile in a desired direction, while movements of the handlebars 6 cause corresponding movements of the skis 7, 8 to cause desired changes in direction.

Figure 5:
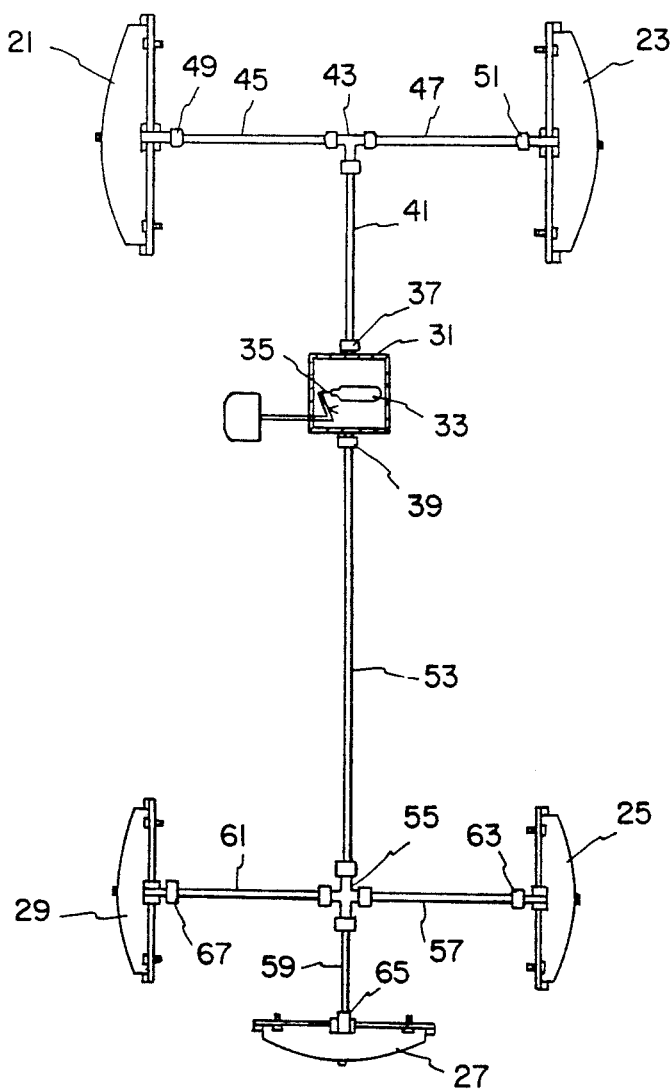
FIG. 5 shows a top view of the inventive flotation system.

The present invention is generally designated by the reference numeral 20 and is best seen with reference to the figures to include flotation devices 21, 23, 25, 27 and 29. With particular reference to FIG. 5, the flotation devices are interconnected into a fluid handling system designed to allow supply to the flotation devices of inflation gas in a manner to be described in greater detail hereinafter. Thus, a chamber 31 contains a cannister 33 of inflation gas. A puncture rod 35 is provided within the chamber 31 and is designed to puncture the cannister 33 either manually or automatically, as will be described in greater detail hereinafter, to allow gas, preferably carbon dioxide gas, to be released from the cannister within the chamber 31. When this occurs, gas flows out from the chamber 31 via the fittings 37, 39. Gas flowing through the fitting 37 travels through conduit 41, T-shaped fitting 43 and thence through respective conduits 45 and 47 to supply gas to respective flotation devices 21, 23 via respective fittings 49, 51. If desired, the various fittings 37, 43, 49 and 51 may have, contained therein, one-way check valves preventing reverse flow of gas toward the chamber 31 while allowing flow of gas toward the flotation devices 21, 23. In this way, once the flotation devices 21, 23 have been inflated, they will not be deflated until appropriate.

In a similar fashion, gas flowing through the fitting 39 flows through the conduit 53, four-sided fitting 55, and through respective conduits 57, 59 and 61 to supply respective flotation devices 25, 27, 29 via fittings 63, 65 and 67. The fittings 39, 55, 63, 65 and 67 may, if desired, be supplied with one-way check valves allowing flow of gas from the chamber 31 toward the flotation devices 25, 27, 29 while preventing reverse flow of gas toward the chamber 31. In this way, after the flotation devices 25, 27, 29 have been inflated, they will remain inflated until an appropriate time.

Figure 2:
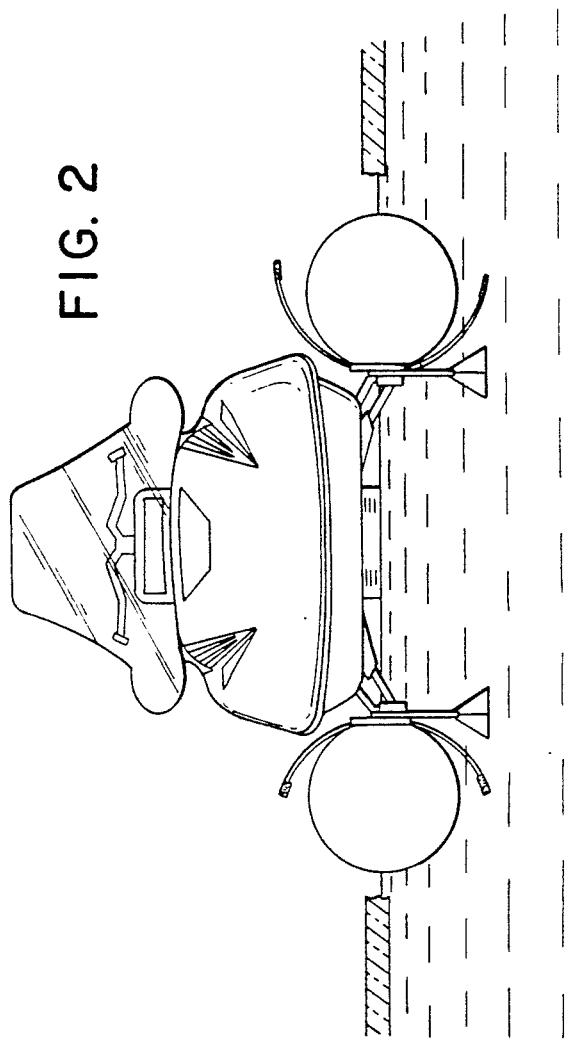
FIG. 2 shows a front view of the present invention as operating to maintain flotation of a snowmobile in a body of water.
Figure 3:
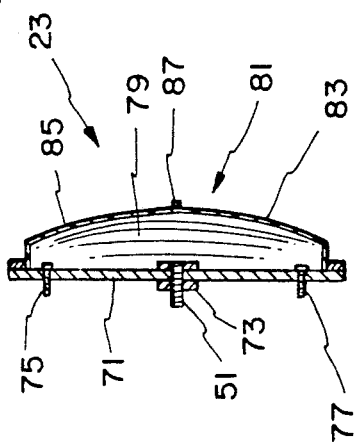
FIG. 3 shows a cross-sectional view through a flotation device in accordance with the teachings of the present invention in an uninflated condition.
Figure 4:
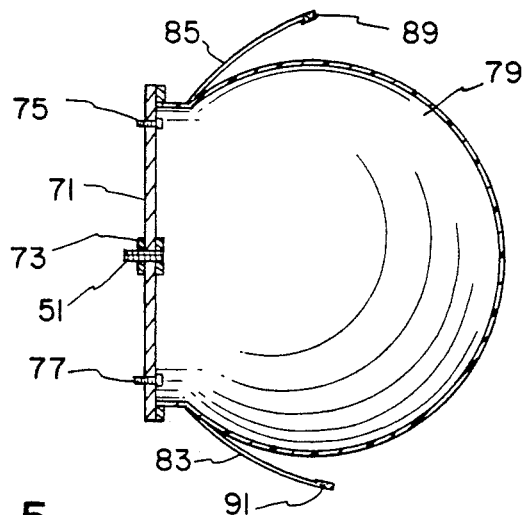
FIG. 4 shows a cross-sectional view through the flotation device illustrated in FIG. 3 but in the inflated condition.

With reference, now, to FIGS. 3 and 4, the specific details of one flotation device will be described in detail, which details are representative of the details of the other flotation devices.

With reference to FIGS. 3 and 4, the flotation device 23 is particularly shown. The flotation device 23 includes a plate 71 having the fitting 51 extending through an opening therethrough and attached by virtue of a nut 73 threaded over the threaded outer periphery of the fitting 51. Additional bolts 75, 77 may be employed to securely fasten the flotation device 23 to the plate 71, in anticipation of the fact that the flotation device 23 will be supporting a large weight.

The plate 71 may be bolted to the body 2 of the snowmobile 1 in any suitable manner such as through the use of the bolts 75, 77 extending through wall portions of the body 2 of the snowmobile 1.

FIG. 3 depicts the flotation device 23 in the inoperative position, including a float 79 and a cover 81 made up of two halves 83, 85 releasably interconnected at a seam 87 by virtue of hook and pile fastening means 89, 91. As seen with particular reference to FIG. 4, when the float 79 is inflated in accordance with the teachings of the present invention, the seam 87 is separated by the inflation process so that the portions 83, 85 of the cover are then configured in the manner shown in FIG. 4.

Figure 6:
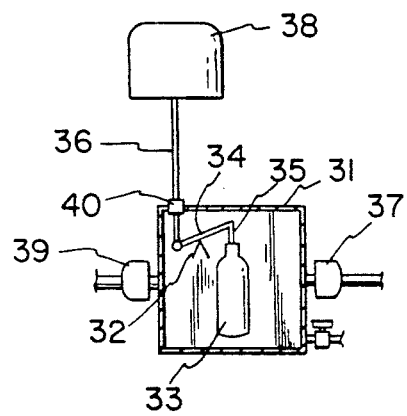
FIG. 6 shows a first embodiment of the means for actuating the inventive flotation system.

With particular reference to FIG. 6, a first embodiment of the manner of actuation of the inventive system 20 will now be described. For this purpose, it is seen that a fulcrum 32 is provided within the chamber 31 and a lever 34 is connected at one end to the puncture rod 35 and at another end to an elongated actuation rod 36 having an actuator handle 38 at an end thereof. The rod 36 extends into the chamber 31 via a sealed opening 40. The actuator handle 38 is also seen in FIGS. 1 and 8.

Thus, when it is desired to activate the inventive system, the actuator handle is pulled upwardly in the view of FIG. 6 to cause the lever 34 to pivot about the fulcrum 32 to cause the puncture rod 35 to puncture the cannister 33 thereby releasing gas into the chamber 31 and whence through the fittings 37, 39 and thereafter through the conduits 41, 53, etc. to inflate the floats 21, 23, 25, 27 and 29.

Figure 7:
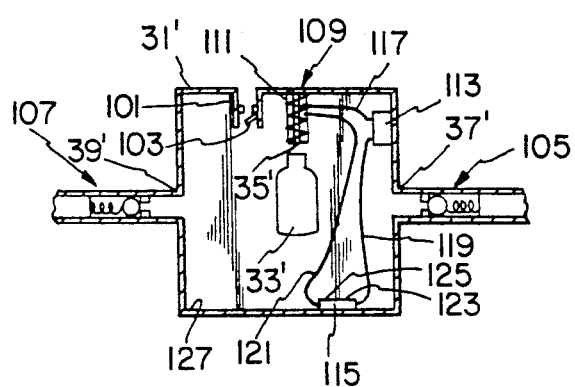
FIG. 7 shows a second embodiment of the means for actuating the inventive flotation system.

With reference to FIG. 7, an alternative mode of activation of the inventive system is shown. Like elements in FIG. 6 are shown in FIG. 7 using like primed reference numerals.

With reference to FIG. 7, the chamber 31' is intended to be located at a low portion of the body 2 of the snowmobile 1 so that if the snowmobile is dropped in the water, the chamber 31' is immediately immersed therein. Within the chamber is the cannister 33' and a puncture rod 35'.

The chamber 31' has an inlet 101 having contained therein a normally opened pivoting check valve 103 allowing flow of water into the chamber 31'. The outlet fittings 37', 39' have contained therein respective check valves 105, 107 which allow flow away from the chamber 31' but not toward the chamber 31'.

A solenoid 109 is mounted within the chamber 31' and includes an electrical coil 111 interconnected with a battery 113 and a moisture-sensitive switch 115 via the electrical conductors 117, 119 and 121.

The switch 115 includes moisture-sensitive electrodes 123, 125 and is located on a bottom wall 127 of the chamber 31'.

In the operation of the embodiment of FIG. 7, when the associated snowmobile is dropped into a body of water, water immediately enters the chamber 31' via the port 101 and begins to fill the chamber 31' thereby immersing the electrodes 123, 125. When these electrodes are immersed, the switch 115 is closed thereby energizing the solenoid 109 causing the plunger thereof 35 to descend thereby puncturing the container 33' to release the gas contained therein within the chamber 3'. When this happens, pressure of gas within the chamber 31' causes immediate closure of the check valve 103 to prevent escape of gas out the port 101. Thus, gas flows past the check valves 105, 107 and thence through the conduits and fittings as illustrated in FIG. 5 to inflate the flotation devices 21, 23, 25, 27 and 29.

If desired, the actuation devices illustrated in FIG. 6 and FIG. 7 may be combined together in a single installation to provide redundancy in case, for example, the operator of the snowmobile is rendered unconscious before being able to pull the manual handle 38.

Accordingly, an invention has been disclosed in terms of preferred embodiments thereof which fulfill each and every one of the objects of the invention as set forth hereinabove and provide a new and improved snowmobile flotation system of great novelty and utility.

Of course, various changes, modifications and alterations in the teachings of the present invention may be contemplated by those skilled in the art without departing from the intended spirit and scope of the present invention.

As such, it is intended that the present invention only be limited by the terms of the appended claims.

We claim:

1. In a snowmobile having a body with a forward end and a rearward end, a steerable ski at said forward end and motive power means, the improvement comprising a flotation system comprising:
   (a) a plurality of flotation devices mounted at spaced locations on said snowmobile including two flotation devices on opposed sides exterior of said forward end and two flotation devices on opposed sides exterior of said rearward end;

(b) a source of inflation gas;
(c) fluid passageway means for fluidly connecting said source with said flotation devices;
(d) means for releasing said inflation gas from said source to inflate said flotation devices;
(e) each of said flotation devices including:
   (i) an inflatable float fluidly connected to said fluid passageway means;
   (ii) said float having a collapsed configuration, before inflation, wherein said float lies adjacent said body;
   (iii) further wherein, in said collapsed configuration, said float is enclosed by a cover having first and second halves meeting at an elongated interface outward of said float with respect to said body, and fastening means at said interface releasably fastening said halves together to cover and enclose said float, said fastening means releasing upon inflation of said float.

2. The invention of claim 1, wherein said means for releasing comprises a chamber containing said source, said source comprising a cannister of pressurized gas and an actuator including means for puncturing said cannister to release said gas into said chamber.

3. The invention of claim 2, wherein said fluid passageway means are fluidly connected to said chamber.

4. The invention of claim 3, wherein one-way valve means are provided in said fluid passageway means for preventing flow of gas toward said chamber.

5. The invention of claim 2, wherein said actuator includes a manually actuable handle mechanically connected to said puncturing means.

6. The invention of claim 4, wherein said actuator includes an electrical actuator operatively connected to said puncturing means, a source of electrical power connected to said electrical actuator and moisture responsive switch means interposed between said source of electrical power and said electrical actuator, whereby when said switch means is immersed in water, said switch means is closed thereby activating said electrical actuator.

7. The invention of claim 6, wherein said electrical actuator comprises a solenoid.

8. The invention of claim 6, wherein said source of electrical power comprises a battery.

* * * * *